US011087936B2

(12) United States Patent
Chen

(10) Patent No.: US 11,087,936 B2
(45) Date of Patent: Aug. 10, 2021

(54) LIGHT GUIDE STRUCTURE AND LIGHT-EMITTING KEYBOARD DEVICE

(71) Applicants: LITE-ON ELECTRONICS (GUANGZHOU) LIMITED, Guangzhou (CN); Lite-On Technology Corporation, Taipei (TW)

(72) Inventor: Yi-Wen Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/799,835

(22) Filed: Feb. 25, 2020

(65) Prior Publication Data

US 2020/0335290 A1    Oct. 22, 2020

Related U.S. Application Data

(60) Provisional application No. 62/834,408, filed on Apr. 16, 2019.

(30) Foreign Application Priority Data

Dec. 31, 2019    (CN) .......................... 201911414904.8

(51) Int. Cl.
| | |
|---|---|
| *H01H 13/83* | (2006.01) |
| *G06F 3/044* | (2006.01) |
| *G06F 1/16* | (2006.01) |
| *F21V 8/00* | (2006.01) |

(52) U.S. Cl.
CPC ........... *H01H 13/83* (2013.01); *G02B 6/0055* (2013.01); *G06F 1/169* (2013.01); *G06F 3/0445* (2019.05); *H01H 2219/06* (2013.01); *H01H 2219/062* (2013.01)

(58) Field of Classification Search
CPC ....................... H01H 13/83; H01H 2219/0621
See application file for complete search history.

(56) References Cited

U.S. PATENT DOCUMENTS

| 10,747,051 | B2 * | 8/2020 | Hsu ...................... G02B 6/0073 |
| 2008/0297693 | A1 * | 12/2008 | Lin ....................... G02B 6/0083 349/65 |
| 2009/0103964 | A1 * | 4/2009 | Takagi ................... H01H 3/125 400/495 |

(Continued)

*Primary Examiner* — Jong-Suk (James) Lee
*Assistant Examiner* — Eric T Eide
(74) *Attorney, Agent, or Firm* — JCIPRNET

(57) ABSTRACT

The invention provides a light guide structure, adapted to be disposed under a baseplate of a keyboard module. The light guide structure includes: a light guide plate, a mask layer and a reflective layer. The light guide plate includes a first surface, a second surface opposite to the first surface, and a first opening running through the first and second surfaces. The mask layer is located between the baseplate and the light guide plate, and includes a second opening corresponding to the first opening. The reflective layer includes a first part and a second part connected to each other, wherein the first part is disposed on the second surface of the light guide plate, and the second part runs through the first opening and is disposed on a lower surface of the baseplate. The invention further provides a light-emitting keyboard device.

18 Claims, 11 Drawing Sheets

(56) References Cited

U.S. PATENT DOCUMENTS

| | | | |
|---|---|---|---|
| 2011/0043384 A1* | 2/2011 | Cheng | H01H 13/83 |
| | | | 341/22 |
| 2014/0218890 A1* | 8/2014 | Wang | G02B 6/0055 |
| | | | 362/23.03 |
| 2016/0109636 A1* | 4/2016 | Weng | G02B 6/005 |
| | | | 362/23.03 |
| 2019/0148091 A1* | 5/2019 | Pan | H01H 13/7065 |
| | | | 200/5 A |

* cited by examiner

LIGHT GUIDE STRUCTURE AND LIGHT-EMITTING KEYBOARD DEVICE

CROSS REFERENCE TO RELATED APPLICATION

This application claims the priority benefits of U.S. provisional application Ser. No. 62/834,408, filed on Apr. 16, 2019, and China application serial no. 201911414904.8, filed on Dec. 31, 2019. The entirety of each of the above-mentioned patent applications is hereby incorporated by reference herein and made a part of this specification.

BACKGROUND OF THE INVENTION

1. Field of the Invention

The invention relates to a light guide structure and a light-emitting keyboard device, and more particularly, to a light guide structure and a light-emitting keyboard device that can alleviate light leakage in an opening.

2. Description of Related Art

In recent years, design trends of notebook computers are directed toward lighter and thinner products. In some notebook computers, a plastic part is selected to be used in an upper frame (a C part) of a lower body of a notebook computer to reduce the weight, so a manner for fixing a light-emitting keyboard device to the frame also needs to be changed correspondingly. However, the change of such a system design greatly affects an effect of a backlight module, and light leakage may occur in an opening for fixing the light-emitting keyboard device.

SUMMARY OF THE INVENTION

The invention provides a light guide structure, which can alleviate light leakage in an opening.

The invention provides a light-emitting keyboard device, including the foregoing light guide structure.

A light guide structure according to an embodiment of the invention is adapted to be disposed under a baseplate of a keyboard module. The light guide structure includes: a light guide plate, a mask layer and a reflective layer. The light guide plate includes a first surface, a second surface opposite to the first surface, and a first opening running through the first surface and the second surface. The mask layer is located between the baseplate and the light guide plate, and includes a second opening corresponding to the first opening. The reflective layer includes a first part and a second part connected to each other, wherein the first part is disposed on the second surface of the light guide plate, and the second part runs through the first opening to be disposed on a lower surface of the baseplate.

According to an embodiment of the invention, the second part includes a third opening corresponding to the second opening and the first opening, and the third opening is smaller than the second opening and the first opening.

According to an embodiment of the invention, the reflective layer is a ground metal layer.

According to an embodiment of the invention, the second opening is smaller than or equal to the first opening.

According to an embodiment of the invention, the second opening is larger than the first opening.

A light-emitting keyboard device according to an embodiment of the invention includes a keyboard module, a light guide structure and a frame. The frame includes a fixing member. The keyboard module includes a baseplate, a thin film circuit layer and a plurality of keys. The baseplate includes a fourth opening. The thin film circuit layer is disposed on the baseplate, and includes a fifth opening corresponding to the fourth opening. The plurality of keys are disposed on the thin film circuit layer. The light guide structure is disposed under the baseplate, and includes a light guide plate, a mask layer and a reflective layer. The light guide plate includes a first surface, a second surface opposite to the first surface, and a first opening running through the first surface and the second surface. The mask layer is located between the baseplate and the light guide plate, and includes a second opening corresponding to the first opening. The reflective layer includes a first part and a second part connected to each other, wherein the first part is disposed on the second surface of the light guide plate, the second part runs through the first opening to be disposed on a lower surface of the baseplate, and the second part includes a third opening. A light source is disposed on a light incident surface of the light guide plate. The fixing member runs through the fifth opening, the fourth opening and the third opening, and an abutting portion of the fixing member abuts against a bottom surface of the second part.

According to an embodiment of the invention, the third opening is smaller than the second opening and the first opening, and the third opening is larger than the fourth opening.

According to an embodiment of the invention, the second part of the reflective layer is not glued on the lower surface of the baseplate.

According to an embodiment of the invention, the fixing member is a hot melt pole, a screw, or two clamping hooks suitable for being combined or separated.

According to an embodiment of the invention, a periphery of the fourth opening is plate-shaped.

According to an embodiment of the invention, the fixing member is flush with or does not exceed the first part of the reflective layer.

According to an embodiment of the invention, the fixing member exceeds the first part of the reflective layer.

According to an embodiment of the invention, a light shield layer is disposed around the fourth opening on an upper surface of the baseplate.

According to an embodiment of the invention, the reflective layer is a ground metal layer.

Based on the foregoing, in the light guide structure of the invention, the second part of the reflective layer runs through the first opening to be disposed on the lower surface of the baseplate, to reduce a probability of light leakage in the opening to improve optical efficiency. In addition, in the light-emitting keyboard device of the invention, through the design that the frame includes the fixing member, the fixing member runs through the fifth opening, the fourth opening and the third opening, and an abutting portion of the fixing member abuts against the bottom surface of the second part, so that the reflective layer abuts against the baseplate, to reduce the probability of light leakage in the opening.

BRIEF DESCRIPTION OF THE DRAWINGS

The accompanying drawings are included to provide a further understanding of the invention, and are incorporated in and constitute a part of the specification. The accompanying drawings illustrate embodiments of the invention and, together with the description, serve to explain the principles of the invention.

DESCRIPTION OF THE EMBODIMENTS

Figure 1:
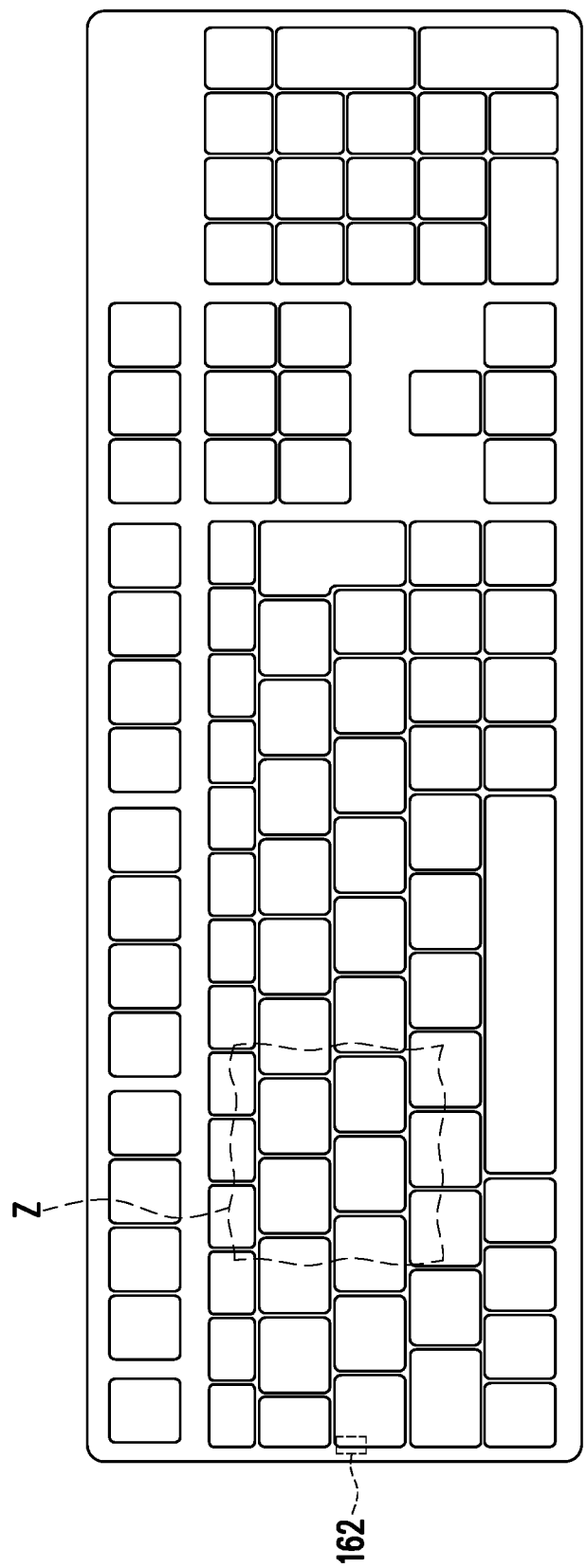
FIG. 1 is a schematic top view of a light-emitting keyboard device according to an embodiment of the invention.

Exemplary embodiments of the invention are described in detail, and examples of the exemplary embodiments are shown in the accompanying drawings. Whenever possible, the same element symbols are used in the drawings and descriptions to indicate the same or similar parts.

Figure 2:
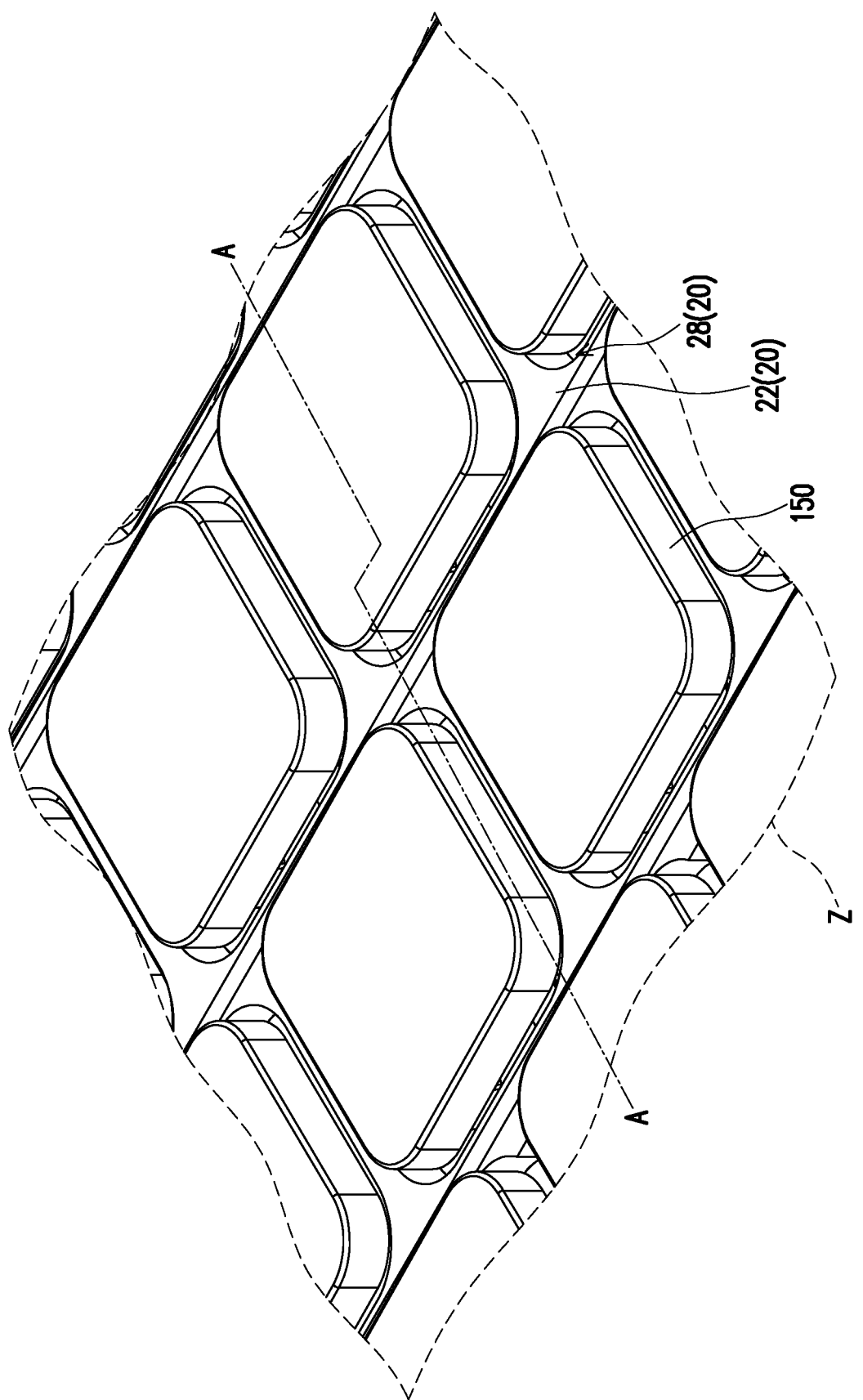
FIG. 2 is a schematic three-dimensional view of an area Z of FIG. 1.
Figure 3:
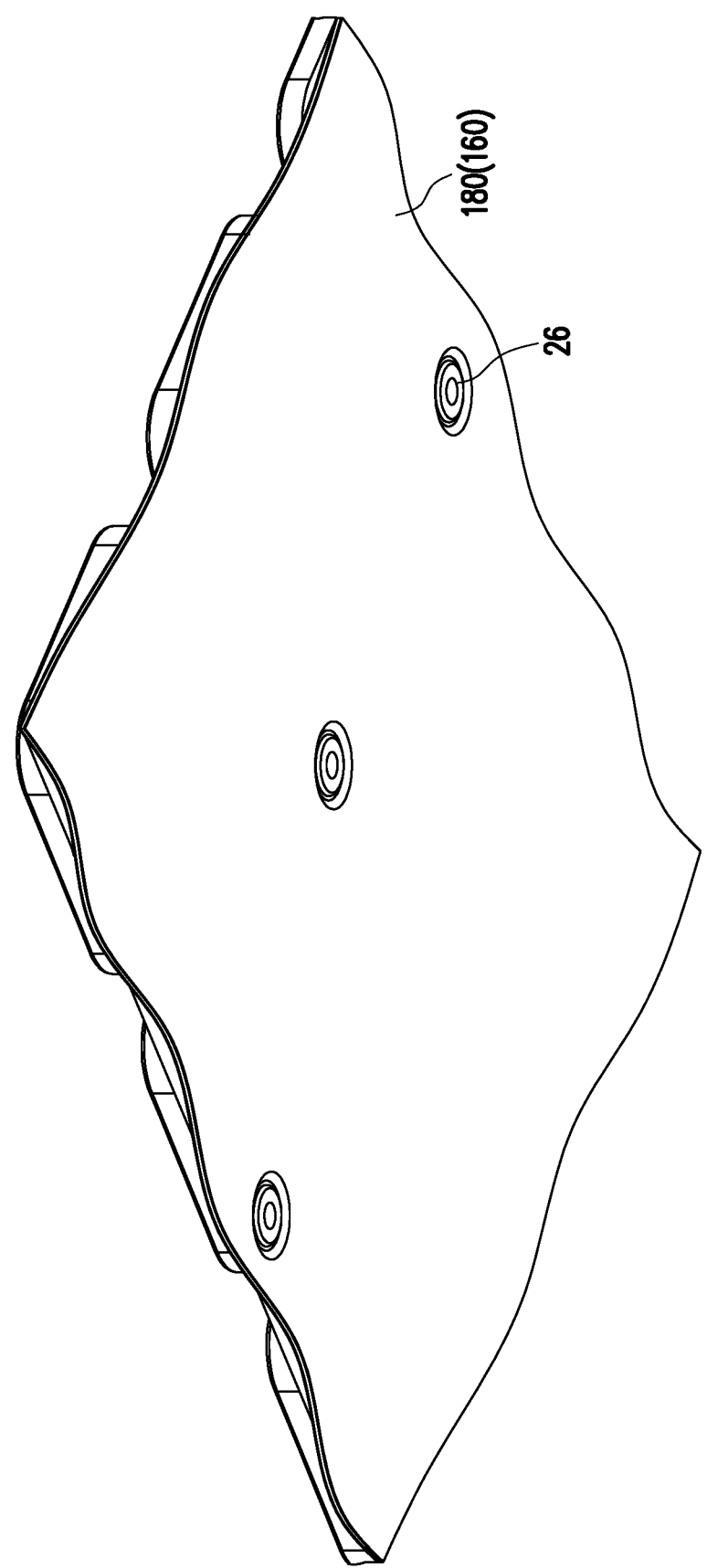
FIG. 3 is a schematic view of FIG. 2 from another angle of view.
Figure 4:
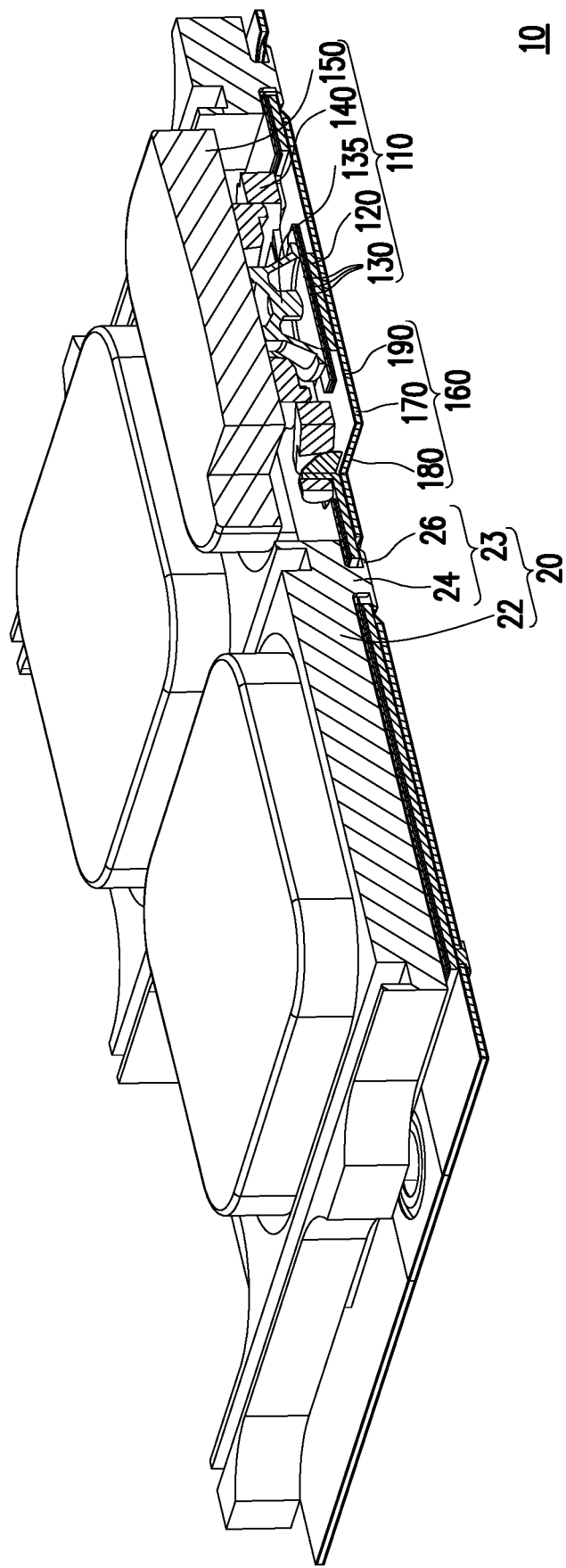
FIG. 4 is a schematic three-dimensional sectional view along a line A-A of FIG. 2.
Figure 5:
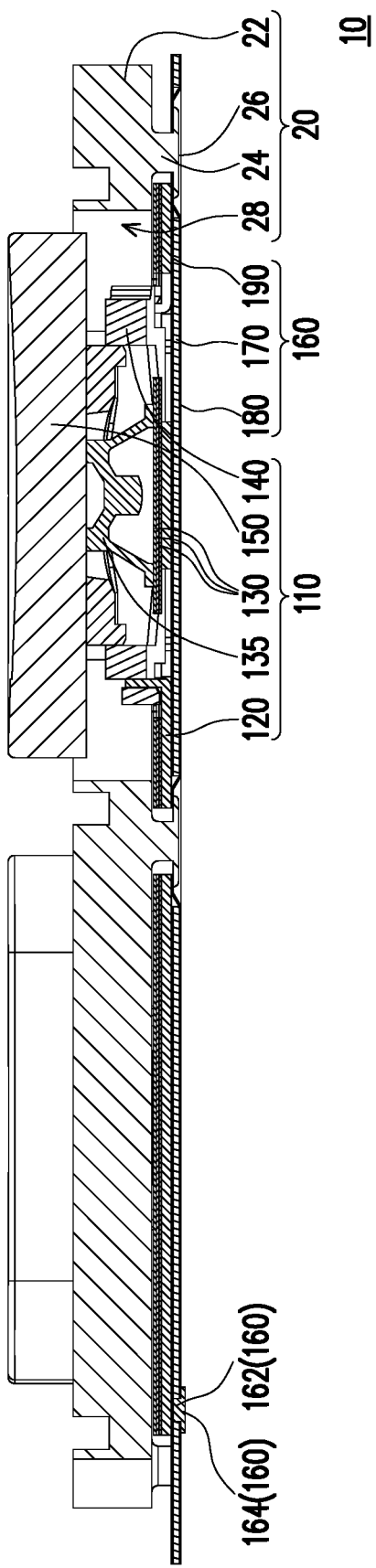
FIG. 5 is a schematic sectional view of FIG. 2.
Figure 6A:
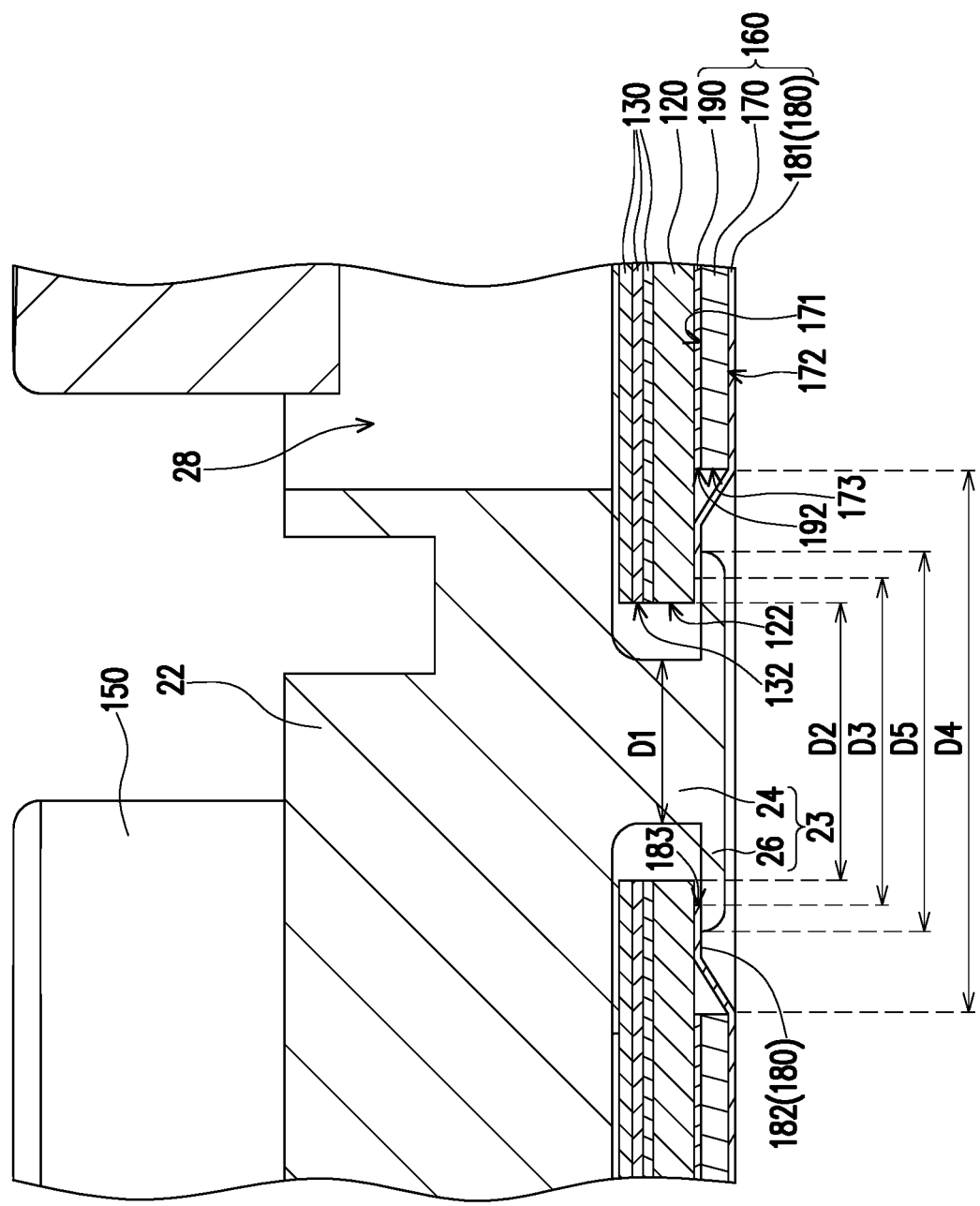
FIG. 6A is a partial enlarged view of FIG. 5.

FIG. 1 is a schematic top view of a light-emitting keyboard device according to an embodiment of the invention. FIG. 2 is a schematic three-dimensional view of an area Z of FIG. 1. FIG. 3 is a schematic view of FIG. 2 from another angle of view. FIG. 4 is a schematic three-dimensional sectional view along a line A-A of FIG. 2. FIG. 5 is a schematic sectional view of FIG. 2. FIG. 6A is a partial enlarged view of FIG. 5.

Referring to FIG. 1 to FIG. 6A, a light-emitting keyboard device 10 of the present embodiment includes a frame 20, a keyboard module 110 disposed in the frame 20, and a backlight module 160 located under the keyboard module 110. In the present embodiment, the frame 20 may be a C part of a lower body of a notebook computer, but is not limited thereto. The frame 20 is, for example, a plastic part, and has a relatively light weight. However, types of the frame 20 are not limited thereto.

As shown in FIG. 5 and FIG. 6A, the keyboard module 110 includes a baseplate 120, a thin film circuit layer 130, an elastic member 135 (FIG. 5), a scissor foot structure 140 (FIG. 5) and a plurality of keys 150. The baseplate 120 includes a fourth opening 122. The thin film circuit layer 130 is disposed on the baseplate 120, and includes a fifth opening 132 corresponding to the fourth opening 122.

The elastic member 135 is disposed on a trigger switch (not shown) of the thin film circuit layer 130. The plurality of keys 150 are disposed above the elastic member 135. When the keys 150 are pressed, the keys 150 push against the elastic member 135 to trigger the trigger switch on the thin film circuit layer 130. When the pressure of the keys 150 is removed, the elastic member 135 is configured to provide a restoring force when the keys 150 are pressed. The scissor foot structure 140 connects the baseplate 120 to the keys 150. The scissor foot structure 140 is configured to enable the keys 150 to move up and down in parallel.

In addition, the frame 20 includes a frame body 22 located above the thin film circuit layer 130, a fixing member 23 protruding from the frame body 22 to the baseplate 120, and a plurality of frame openings 28 located on the frame body 22. As shown in FIG. 6A, the elastic member 135 and the scissor foot structure 140 are located in the frame opening 28. The fixing member 23 includes a neck portion 24 connected to the frame body 22 and an abutting portion 26 connected to the neck portion 24. A width (that is, a size D5) of the abutting portion 26 is greater than a width (that is, a size D1) of the neck portion 24. In the present embodiment, the fixing member 23 is a hot melt pole after being hot-melted, and the abutting portion 26 is a structure formed after the hot melt pole is hot-melted. Certainly, forms of the fixing member 23 are not limited thereto.

In addition, as shown in FIG. 5, the backlight module 160 includes a light source 162, a circuit board 164, and a light guide structure. The light guide structure includes a light guide plate 170, a mask layer 190 and a reflective layer 180. The light source 162 is located on the circuit board 164, and runs through the reflective layer 180 to be disposed on a light incident surface of the light guide plate 170. The reflective layer 180 and the light guide plate 170 respectively include two accommodation holes that may accommodate the light source 162. The circuit board 164 is configured to supply power to the light source 162. The light guide plate 170 includes a first surface 171 facing the keyboard module 110, a second surface 172 opposite to the first surface 171, and a first opening 173 running through the first surface 171 and the second surface 172. In the present embodiment, light emitted by the light source 162 is guided into the light guide plate 170, and is transported in the light guide plate 170.

The mask layer 190 is disposed on a lower surface of the baseplate 120 and the first surface 171 (that is, an upper surface) of the light guide plate 170, and is located between the baseplate 120 and the light guide plate 170. The mask layer 190 includes a second opening 192 corresponding to the first opening 173. The mask layer 190 is configured to prevent light leakage. The mask layer 190 may be, for example, a dark-colored coating (black paint) or a dark-colored sheet, but is not limited thereto.

The reflective layer 180 includes a first part 181 and a second part 182 connected to each other. The first part 181 is disposed on the second surface 172 (that is, a lower surface) of the light guide plate 170, and the second part 182 runs through the first opening 173 to be disposed on the lower surface of the baseplate 120. The reflective layer 180 may be configured to reflect the light guided out of the light guide plate 170 back to a light guide layer again. In the present embodiment, through the design that the second part 182 of the reflective layer 180 runs through the first opening 173 to be disposed on the lower surface of the baseplate 120, light leakage in the opening in the backlight module can be effectively avoided. In an embodiment, the reflective layer 180 may also be a ground metal layer or be connected to a system ground plane, to meet a grounding requirement. However, forms of the reflective layer 180 are not limited thereto.

It should be noted that, in the present embodiment, as clearly shown in FIG. 6A, the second part 182 of the reflective layer 180 includes a third opening 183 corresponding to the second opening 192 and the first opening 173. The neck portion 24 of the fixing member 23 runs through the fifth opening 132, the fourth opening 122 and the third opening 183, and the abutting portion 26 of the fixing member 23 abuts against the second part 182 of the reflective layer 180. More specifically, the abutting portion 26 of the fixing member 23 abuts against a bottom surface of the second part 182 of the lower surface of the baseplate 120.

In addition, the abutting portion 26 of the fixing member 23 is at least partially located in the first opening 173. In the present embodiment, the abutting portion 26 of the fixing member 23 does not exceed the first part 181 of the reflective layer 180. In other embodiments, the abutting portion 26 of the fixing member 23 may also be flush with the first part 181 of the reflective layer 180, which does not increase the overall height, but is not limited thereto.

In the present embodiment, the light guide plate 170 is glued on the mask layer 190 and the first part 181 of the reflective layer 180. The second part 182 of the reflective layer 180 is not glued on the baseplate 120. Instead, the second part 182 is abutted by the abutting portion 26 of the fixing member 23, to abut against the baseplate 120. Certainly, in other embodiments, the second part 182 of the reflective layer 180 may also be glued on the baseplate 120.

In the present embodiment, the size D1 of the neck portion 24 of the fixing member 23 is less than a size D2 of the fourth opening 122 and the fifth opening 132, and the neck portion 24 can run through the fourth opening 122 and the fifth opening 132. The size D5 of the abutting portion 26 of the fixing member 23 is greater than the size D2 of the fourth opening 122 and the fifth opening 132, and a size D3 of the third opening 183. The second part 182 of the reflective layer 180 may abut against the baseplate 120, to achieve an effect of preventing light leakage. The design that the fixing member 23 is a hot melt pole may lead to a relatively light weight, so that the light-emitting keyboard device 10 is lightweight.

In addition, it should be noted that, in the present embodiment, the abutting portion 26 of the fixing member 23 abuts against the second part 182 of the reflective layer 180, and completely shields the third opening 183. However, in other embodiments, the abutting portion 26 can only abut against a part of the second part 182, that is, the abutting portion 26 only shields a part of the third opening 183.

In addition, in the present embodiment, the size D3 of the third opening 183 is greater than the size D2 of the fourth opening 122. However, in other embodiments, the size D3 of the third opening 183 may also be equal to the size D2 of the fourth opening 122.

In addition, in the present embodiment, the size D3 of the third opening 183 is less than a size D4 of the second opening 192 and the first opening 173, so that the second part 182 of the reflective layer 180 can be stretched into the second opening 192 and the first opening 173, and attached to the lower surface of the baseplate 120. As a result, the second part 182 attached to the lower surface of the baseplate 120 is located on a same plane with the mask layer 190, and no extra thickness of the backlight module 160 is added.

In the present embodiment, a portion of the baseplate 120 around the fourth opening 122 (that is, a periphery of the fourth opening 122) is plate-shaped, so that the baseplate 120 can maintain a relatively low height. Compared with a known baseplate 120 that has a convex structure to increase the height, the baseplate 120 of the present embodiment can achieve a thinning effect.

Figure 6B:
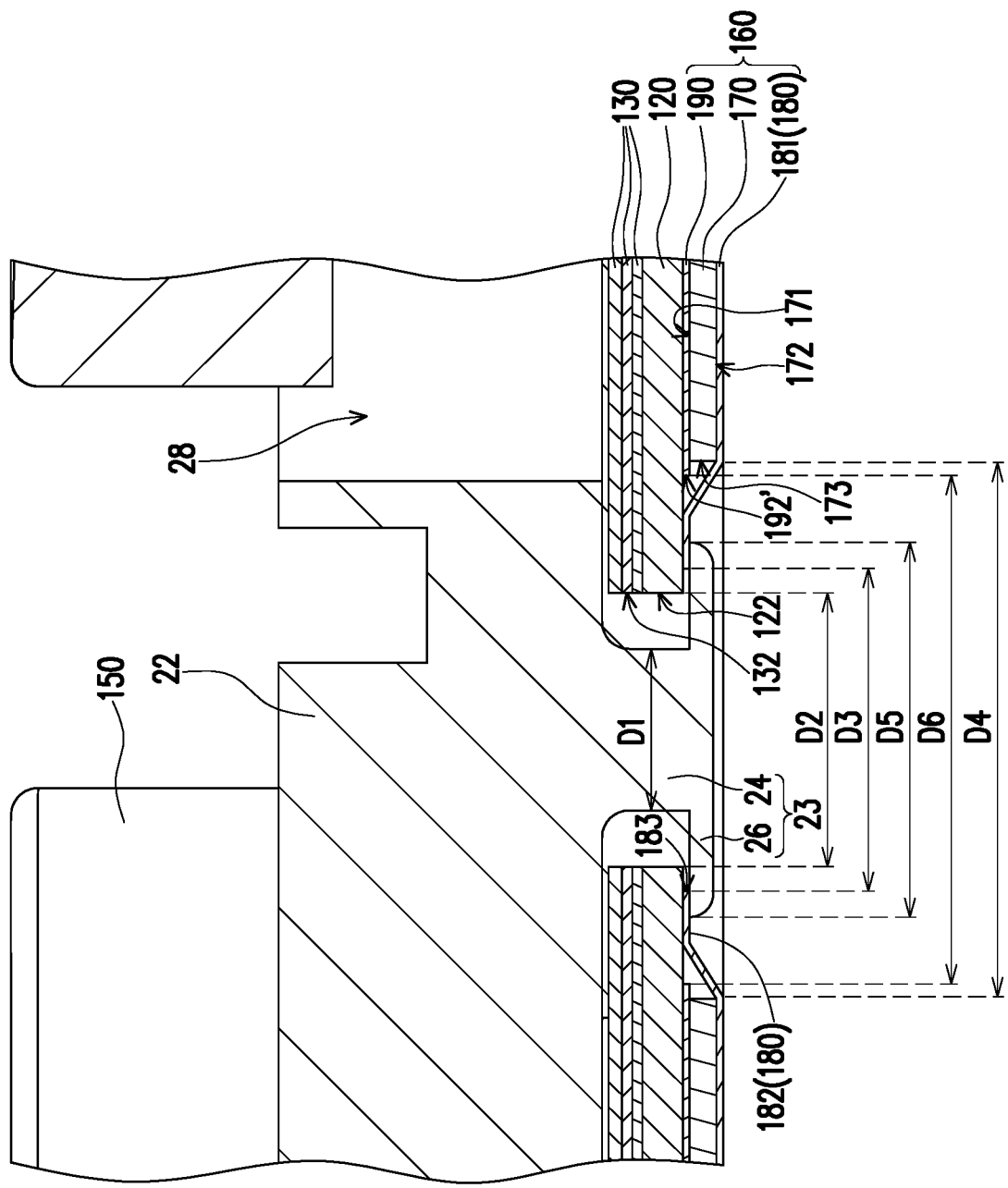
FIG. 6B is a schematic partial sectional view of a light-emitting keyboard device according to another embodiment of the invention.
Figure 6C:
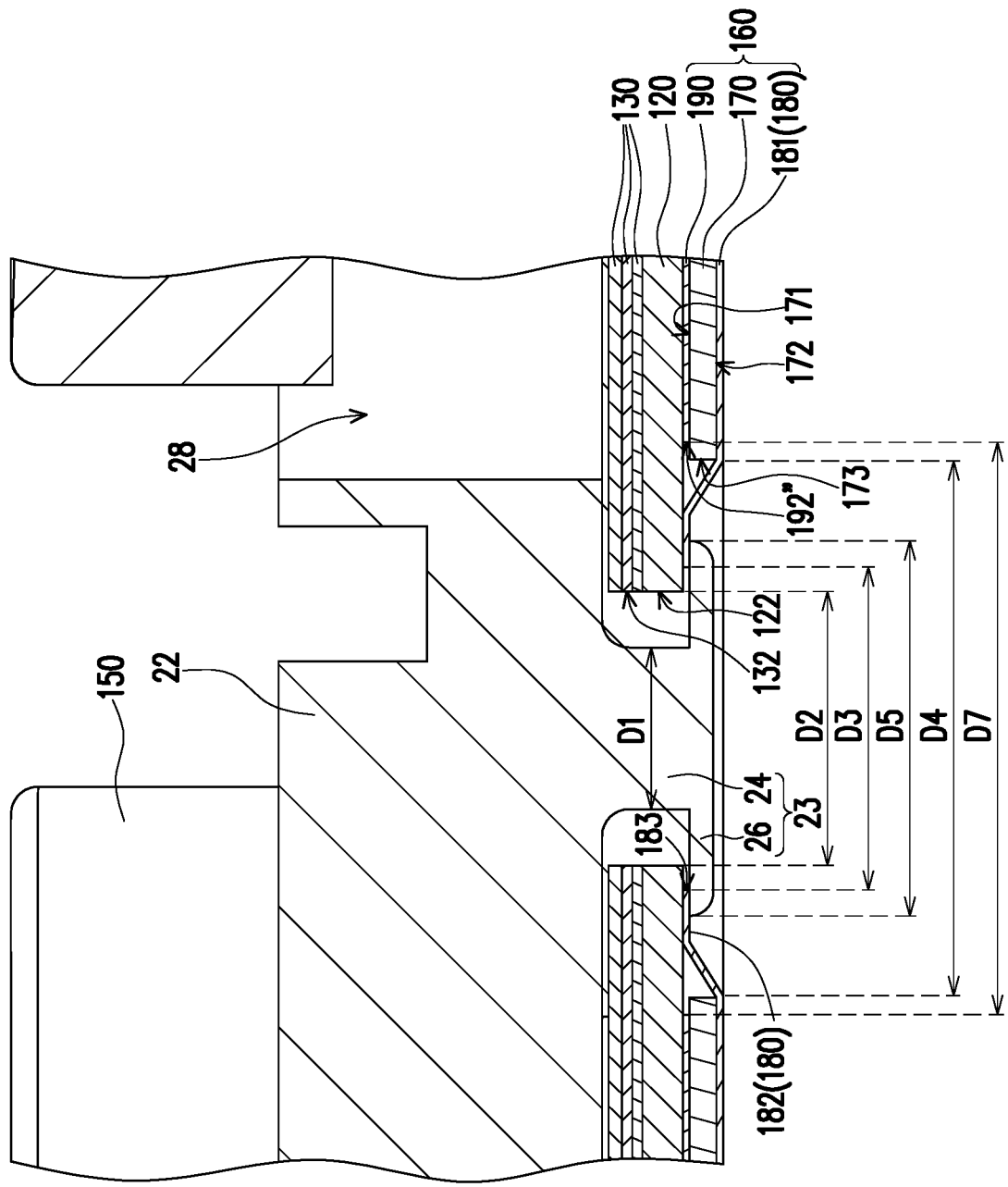
FIG. 6C is a schematic partial sectional view of a light-emitting keyboard device according to another embodiment of the invention.

FIG. 6B is a schematic partial sectional view of a light-emitting keyboard device according to another embodiment of the invention. Referring to FIG. 6B, a main difference between FIG. 6B and FIG. 6A lies in that, in the present embodiment, a size D6 of a second opening 192' is less than the size D4 of the first opening 173. FIG. 6C is a schematic partial sectional view of a light-emitting keyboard device according to another embodiment of the invention. Referring to FIG. 6C, a main difference between FIG. 6C and FIG. 6A lies in that, in the present embodiment, a size D7 of a second opening 192' is greater than the size D4 of the first opening 173.

Figure 7:
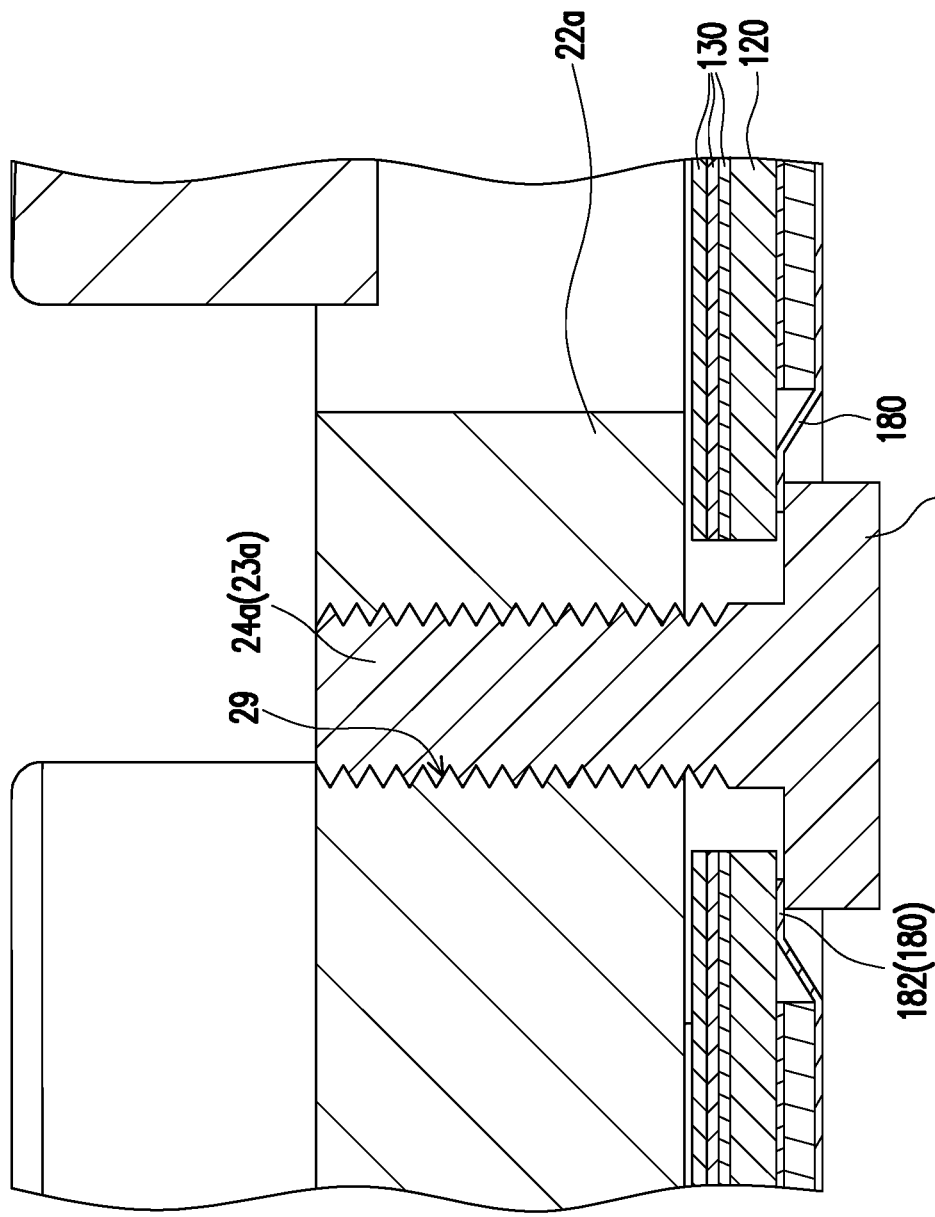
FIG. 7 is a schematic partial sectional view of a light-emitting keyboard device according to another embodiment of the invention.

FIG. 7 is a schematic partial sectional view of a light-emitting keyboard device according to another embodiment of the invention. Referring to FIG. 7, a main difference between FIG. 7 and FIG. 6A lies in forms of the fixing member 23 and a fixing member 23a. In the present embodiment, the fixing member 23a is a screw. That is, an abutting portion 26a of the fixing member 23a is a screw nut, and a neck portion 24a is a screw body. A frame body 22a includes a screw hole 29. The neck portion 24a may be screwed to the screw hole 29 of the frame body 22a, to be fixed to the frame body 22a. Similarly, the abutting portion 26a of the fixing member 23a abuts against the second part 182 of the reflective layer 180, to prevent light leakage on a back surface. In addition, in the present embodiment, the fixing member 23 exceeds the first part 181 of the reflective layer 180, but is not limited thereto.

Figure 8:
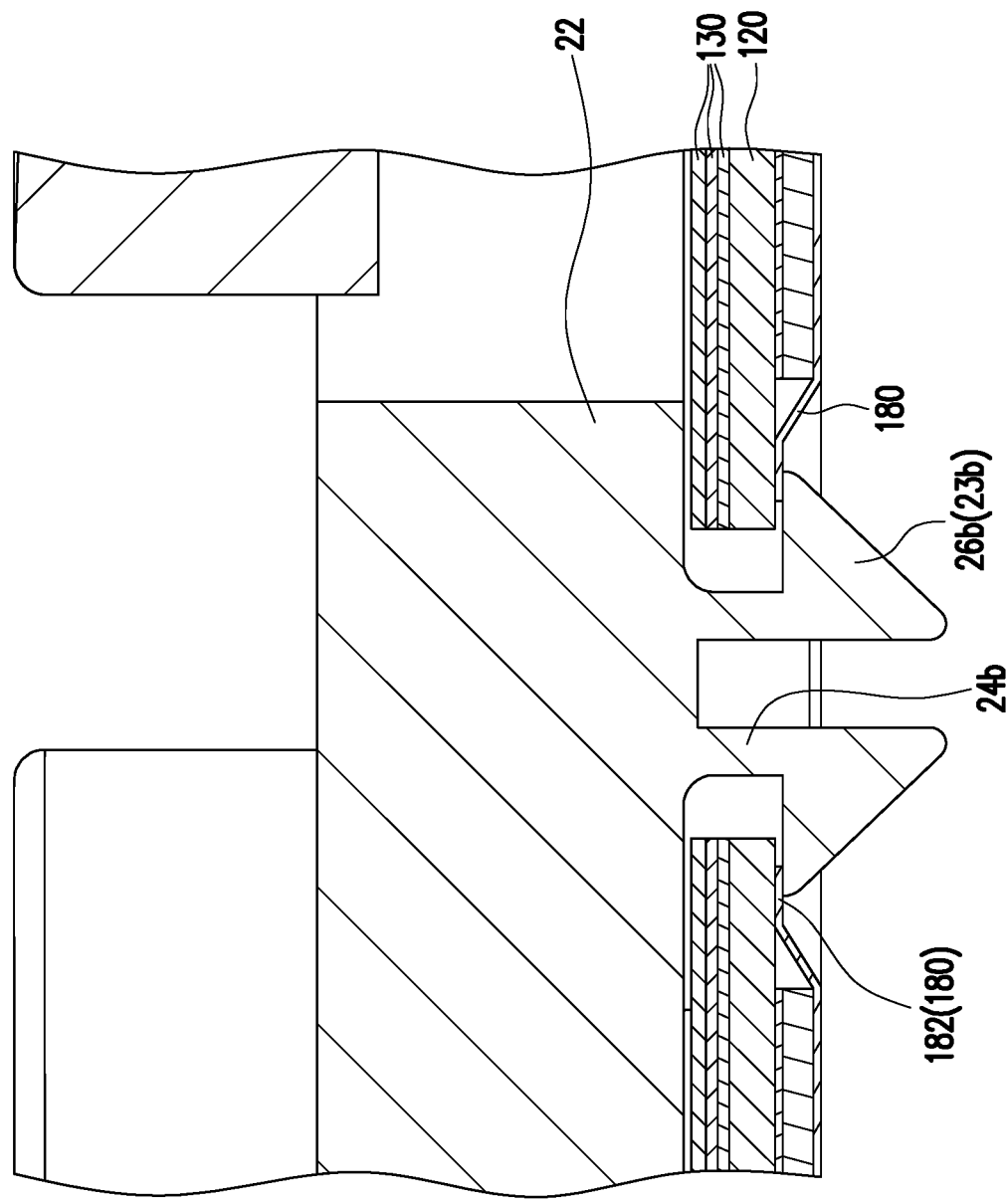
FIG. 8 is a schematic partial sectional view of a light-emitting keyboard device according to another embodiment of the invention.

FIG. 8 is a schematic partial sectional view of a light-emitting keyboard device according to another embodiment of the invention. Referring to FIG. 8, in the present embodiment, a fixing member 23b is two clamping hooks suitable for being combined or separated. An abutting portion 26b is a clamping hook body, and a neck portion 24b connects the clamping hook body to the frame body 22. The fixing member 23b may be directly assembled from top to bottom, which is rather convenient. Similarly, the abutting portion 26b abuts against the second part 182 of the reflective layer 180, to prevent light leakage on a back surface.

Figure 9:
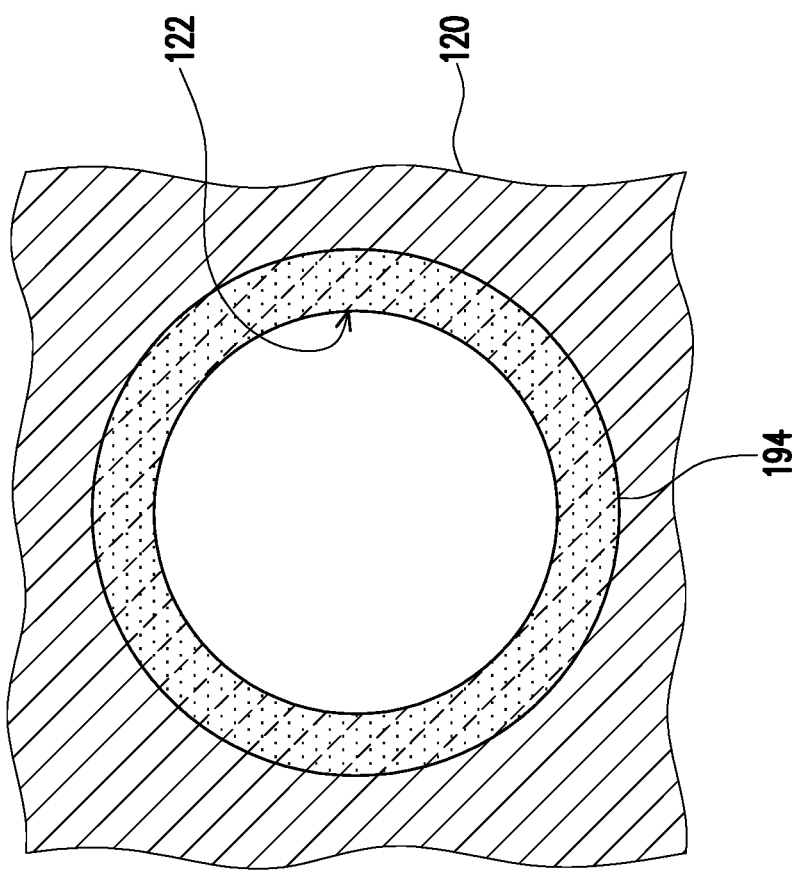
FIG. 9 is a schematic partial view of an upper surface of a baseplate of a light-emitting keyboard device according to another embodiment of the invention.

FIG. 9 is a schematic partial view of an upper surface of a baseplate of a light-emitting keyboard device according to another embodiment of the invention. Referring to FIG. 9, in the present embodiment, an extra light shield layer 194 is disposed around the fourth opening 122 on the upper surface (a surface facing the frame body 22 in FIG. 6A) of the baseplate 120. The light shield layer 194 may be, for example, a dark-colored coating (black paint) or a dark-colored sheet, but is not limited thereto. Such design can prevent light from being reflected around the fourth opening 122 on the upper surface of the baseplate 120, and avoid affecting an optical effect. The light shield layer 194 is, for example, disposed, coated, or printed on the lower surface of the thin film circuit layer 130 (shown in FIG. 6A), but is not limited thereto.

Based on the foregoing, in the light guide structure of the invention, the second part of the reflective layer runs through the first opening to be disposed on the lower surface of the baseplate, to reduces a probability of light leakage in the opening to improve optical efficiency. In addition, in the light-emitting keyboard device of the invention, through the design that the frame includes the fixing member, the fixing member runs through the fifth opening, the fourth opening and the third opening, and the abutting portion of the fixing member abuts against the bottom surface of the second part, so that the reflective layer abuts against the baseplate steadily. In this way, even if a lightweight plastic part material is selected for the frame, the reflective layer can abut against the baseplate steadily, to reduce a probability of light leakage in the opening.

Finally, it should be noted that the foregoing embodiments are merely used for describing the technical solutions of the invention, but are not intended to limit the invention. Although the invention is described in detail with reference to the foregoing embodiments, a person of ordinary skill in the art should understand that, modifications may still be made to the technical solutions in the foregoing embodiments, or equivalent replacements may be made to some or all of the technical features; and such modifications or replacements will not cause the essence of corresponding technical solutions to depart from the scope of the technical solutions in the embodiments of the invention.

What is claimed is:

1. A light guide structure, adapted to be disposed under a baseplate of a keyboard module, wherein the light guide structure comprises:
   a light guide plate, comprising a first surface, a second surface opposite to the first surface, and a first opening running through the first surface and the second surface;
   a mask layer, located between the baseplate and the light guide plate and comprising a second opening corresponding to the first opening; and
   a reflective layer, comprising a first part and a second part connected to each other, wherein the first part is disposed on the second surface of the light guide plate, and the second part runs through the first opening to physically contact a lower surface of the baseplate,
   wherein the baseplate is an integrally formed layer.

2. The light guide structure according to claim 1, wherein the second part of the reflective layer comprises a third opening corresponding to the second opening and the first opening, and the third opening is smaller than the second opening and the first opening.

3. The light guide structure according to claim 1, wherein the reflective layer is a ground metal layer.

4. The light guide structure according to claim 1, wherein the second opening is smaller than or equal to the first opening.

5. The light guide structure according to claim 1, wherein the second opening is larger than the first opening.

6. A light-emitting keyboard device, comprising:
   a frame, comprising a fixing member;
   a light guide structure, disposed under the frame and comprising:
      a light guide plate, comprising a first surface, a second surface opposite to the first surface, and a first opening running through the first surface and the second surface;
      a mask layer, located between the baseplate and the light guide plate and comprising a second opening corresponding to the first opening; and
      a reflective layer, comprising a first part and a second part connected to each other, wherein the first part is disposed on the second surface of the light guide plate, the second part runs through the first opening to physically contact a lower surface of the baseplate, and the second part comprises a third opening;
   a keyboard module, disposed in the frame, wherein the keyboard module comprises:
      a baseplate, comprising a fourth opening;
      a thin film circuit layer, disposed on the baseplate and comprising a fifth opening corresponding to the fourth opening; and
      a plurality of keys, disposed on the thin film circuit layer; and
   a light source, disposed on a light incident surface of the light guide plate,
   wherein the fixing member runs through the fifth opening, the fourth opening and the third opening, and an abutting portion of the fixing member abuts against a bottom surface of the second part, and
   the baseplate is an integrally formed layer.

7. The light-emitting keyboard device according to claim 6, wherein the third opening is smaller than the second opening and the first opening, and the third opening is larger than the fourth opening.

8. The light-emitting keyboard device according to claim 6, wherein the second part of the reflective layer is not glued on the lower surface of the baseplate.

9. The light-emitting keyboard device according to claim 6, wherein the fixing member is a hot melt pole, a screw, or two clamping hooks suitable for being combined or separated.

10. The light-emitting keyboard device according to claim 6, wherein a periphery of the fourth opening is plate-shaped.

11. The light-emitting keyboard device according to claim 6, wherein the fixing member is flush with or does not exceed the first part of the reflective layer.

12. The light-emitting keyboard device according to claim 6, wherein the fixing member exceeds the first part of the reflective layer.

13. The light-emitting keyboard device according to claim 6, wherein a light shield layer is disposed around the fourth opening on an upper surface of the baseplate.

14. The light-emitting keyboard device according to claim 6, wherein the reflective layer is a ground metal layer.

15. The light-emitting keyboard device according to claim 6, wherein the second opening is smaller than or equal to the first opening.

16. The light-emitting keyboard device according to claim 6, wherein the second opening is larger than the first opening.

17. The light guide structure according to claim 1, wherein the second part attached to the lower surface of the baseplate is located on a same plane with the mask layer.

18. The light-emitting keyboard device according to claim 6, wherein the second part attached to the lower surface of the baseplate is located on a same plane with the mask layer.

* * * * *